July 31, 1945.     H. L. GORDON     2,380,592
PIEZOELECTRIC CRYSTAL HOLDER
Filed July 8, 1944     2 Sheets-Sheet 1

Herman L. Gordon Inventor

July 31, 1945.  H. L. GORDON  2,380,592
PIEZOELECTRIC CRYSTAL HOLDER
Filed July 8, 1944  2 Sheets-Sheet 2

Herman L. Gordon, Inventor

Patented July 31, 1945

2,380,592

UNITED STATES PATENT OFFICE 2,380,592

PIEZOELECTRIC CRYSTAL HOLDER

Herman L. Gordon, Silver Spring, Md.

Application July 8, 1944, Serial No. 544,035

12 Claims. (Cl. 171—327)

This invention relates to piezo-electric crystal units and more particularly to a holder for and a method of mounting a piezo-electric plate.

An object of the invention is to provide a holder having a minimum number of different parts so as to facilitate production and assembly thereof.

A feature of the invention is the provision of a holder in which the crystal and its electrodes will be maintained in proper operative relation during all periods of service.

A further feature of the invention is the provision of a holder whose internal elements are substantially cushioned against shock.

A further feature of the invention is the provision of a holder which is provided with means for effectively excluding moisture from the holder.

A further feature of the invention is the provision of an extremely simple, effective and easily mounted fastening means for securing the holder and its contents in assembled relationship whereby rapid assembly of the holder by a relatively unskilled operator is feasible.

A further feature of the invention is the provision of a crystal holder composed of a pair of identical sub-assemblies, the component sub-assemblies being especially suitable for manufacture by mass production methods.

Several examples of embodiments of this invention are shown in the drawings, wherein.

Figure 11:
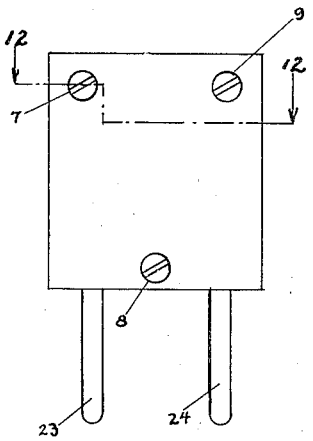
Figure 11 is a side elevation of a crystal holder of the prior art.
Figure 12:
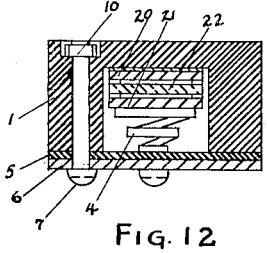
Figure 12 is a sectional view taken on line 12—12 of Figure 11.

In the crystal holders of the prior art the body member usually is formed with a cavity for containing the crystal plate together with a pair of electrodes between which the plate is disposed. Electrical connection is made from each electrode to each of a pair of contact pins extending from the base of the holder body. A spring is inserted between a wall of the holder and at least one electrode to firmly press the electrodes onto the crystal plate at its corners. In one form of holder of the prior art, as illustrated in Figures 11 and 12, a cover plate 6 is used to close the holder and a gasket 5 is used between the cover plate 6 and holder body 1 to moisture-seal the cavity. The spring 4 exerts pressure on the cover plate 6 urging it outwardly against the restraining screws 7, 8 and 9, which are used to secure the cover plate to the holder body. The force of the spring is usually sufficient to slightly warp the cover plate 6, permitting moisture leakage through the gasket unless the cover plate is made of relatively heavy gauge metal or of relatively thick phenolic material.

In the holders of the prior art as exemplified by Figures 11 and 12, the assembly includes a plurality of elements of different size and shape, for example, body member 1, electrodes 20 and 21, crystal plate 22, spring 4, gasket 5, cover plate 6 and fastening screws 7, 8 and 9, each provided with a nut 10. Electrodes 20 and 21 are electrically connected with pins 23 and 24 respectively. The assembly of this unit requires a substantial degree of skill since the cover plate is mounted against the pressure of spring 4 and the screws 7, 8 and 9 must be carefully adjusted for equalization of bearing pressure on gasket 5.

When the holder of Figures 11 and 12 is completely assembled, spring 4, while maintaining crystal plate 22 in a desirable tightly clamped relationship between electrodes 20 and 21, nevertheless tends to make the holder leaky by urging cover plate 6 away from body member 1 and relaxing the bearing pressure on gasket 5.

In the holder of this invention as shown in

Figure 1:
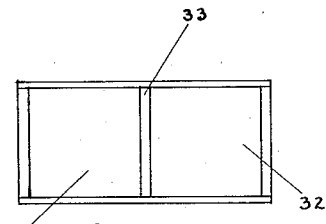
Figure 1 is a plan view showing the appearance of the top of a crystal holder embodying this invention.
Figure 4:
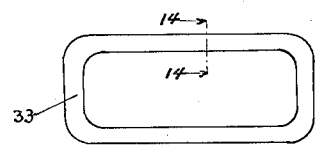
Figure 4 is a plan view of a ring-shaped gasket used in the holder of this invention.
Figure 14:
Figure 14 is a sectional view taken on line 14—14 of Figure 4 showing the normal cross-sectional shape of the gasket used in the holder of this invention.
Figure 2:
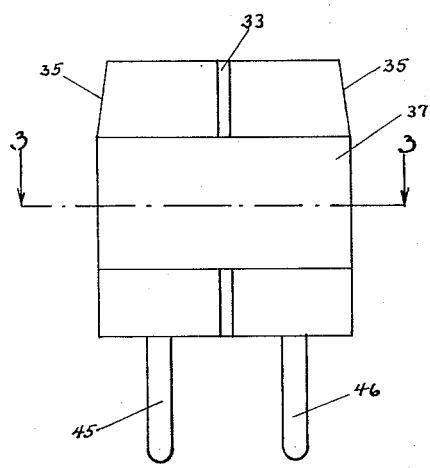
Figure 2 is an elevation showing the appearance of the side of the holder.
Figure 5:
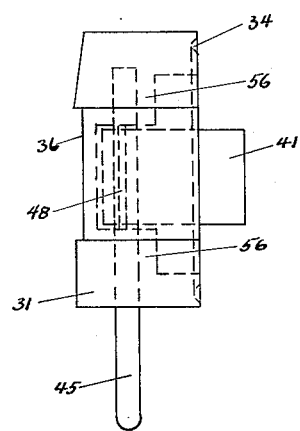
Figure 5 is an elevation showing the appearance of a sub-assembly of the holder of Figures 1, 2 and 3.
Figure 6:
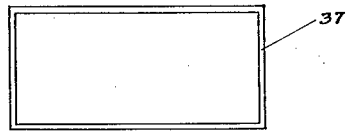
Figure 6 is a plan view of a securing band used to maintain the holder assembled.
Figure 7:
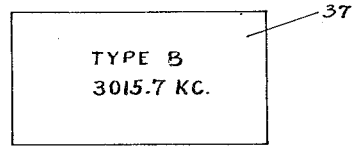
Figure 7 is an elevation of the securing band of Figure 6.

Figures 1 to 10, the holder body is divided into two identical segments 31 and 32 separated by a resilient gasket ring 33 of deformable material such as rubber or neoprene, for example. Each segment 31 and 32 is provided at the joining plane with a peripherally extending groove 34 into which gasket 33 is compressed during assembly of the holder. The groove 34 is shown as V-shaped in cross-section but may be semi-circular, trapezoidal, rectangular or any other suitable shape. The gasket 33 is sufficiently large in cross-section to completely fill the grooves in each segment and to flow out slightly under pressure so as to permit a slight squeezing together of segments 31 and 32. Each segment 31 and 32 is provided with a tapered upper side edge at 35 and a grooved side portion at 36. A band member 37, as shown in Figures 6 and 7, which may be made of either metal or rigid non-metallic material is slipped over the tapered upper side edges 35 of the segments 31 and 32 and forced into groove 36, thereby maintaining the segments 31 and 32 in assembled relationship. Due to the sealing action of gasket 33 the internal cavity of the holder is rendered substantially moisture-proof.

Figure 3:
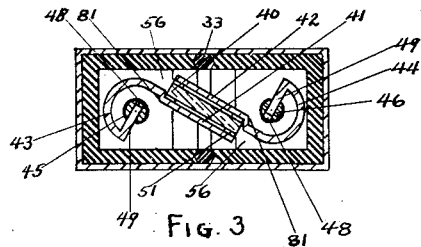
Figure 3 is a sectional view taken on line 3—3 of Figure 2, showing a cross-section of one embodiment of a holder according to this invention.

In the embodiment shown in Figure 3 the crystal plate 40 is compressed between two identical electrode elements 41 and 42 which have integral resilient spring portions 43 and 44. Contact pins 45 and 46 are each moulded into the respective segments 31 and 32 and each pin extends through the cavity, as shown in Figure 5, to form a support post for each electrode element. A slot 48 is provided in each post into which the straight end portions 49 of spring portions 43 and 44 are inserted to hold the straight end portions 49 against rotation with respect to the posts. The end portions 49 may be secured in the slots 48 either by a simple friction fit or by spot-welding. Shoulders 56 are provided adjacent the top and bottom of each cavity to maintain the crystal plate 40 in approximately correct vertical position during assembly. Each electrode element is offset as at 81 to provide lateral positioning shoulders for the crystal plate 40 and also is provided with integral corner land portions 51 to contact the crystal plate at each of its four corners and to provide a small air gap between the major portions of the electrode surfaces and the crystal surfaces.

In assembling the unit, sub-assemblies each comprising a segment element and an electrode element are prepared. The electrode element is inserted and secured in proper position in the segment element. A crystal plate is placed against an electrode element on one sub-assembly. A gasket ring is fitted into the gasket groove on the first sub-assembly and a second sub-assembly is joined to the first sub-assembly so that the crystal plate is positioned between two electrode elements in the position shown in Figure 3. A securing band 37 is then slipped over the two joining segments and forced into position in grooves 36 on each segment. The securing band may carry information as to the crystal frequency and performance characteristics of the unit, as shown in Figure 7.

Figure 8:
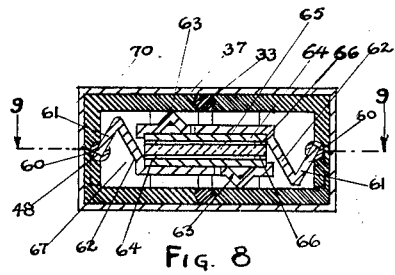
Figure 8 is a sectional view similar to Figure 3 taken on line 8—8 of Figure 9 showing a modified form of holder according to this invention.
Figure 9:
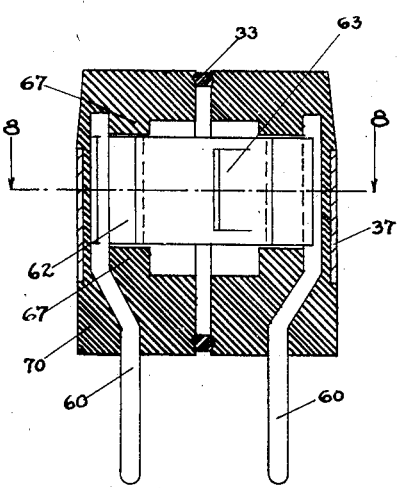
Figure 9 is a sectional view on line 9—9 of Figure 8.
Figure 10:
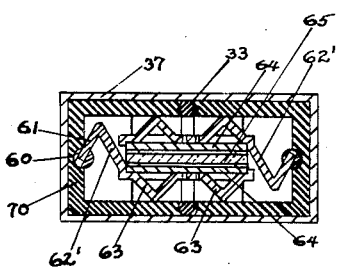
Figure 10 is a sectional view similar to Figure 8 showing a further modification of a holder according to this invention.

In the embodiments shown in Figures 8, 9 and 10 the external structure of the holder elements is the same as in the embodiment of Figures 1 to 7 but the interior structure is modified somewhat to increase the space available inside the holder so that a somewhat larger crystal plate may be received therein, so that the moulding of the segments may be simplified, and also, so that greater spring pressure on the electrodes may be obtained than in the first embodiment.

In the embodiment of Figures 8 and 9 the combination pin and post element 60 is formed to be laterally offset, as shown in Figure 9, and is moulded to be partially embedded in the side edge wall of the holder segment 70, as clearly shown in Figure 8. The slot 48 is provided in post member 60 to receive the end 61 of resilient spring member 62. The end 61 is secured in slot 48 either by friction or by spot-welding. Being thus secured, cantilever action of this portion of spring member 62 is obtained at slot 48. A bend 63 is further provided adjacent the outer end of spring member 62 to cooperate with the inside wall surface of a mating holder segment during the assembly of the holder to develop substantial spring pressure against the electrode 64. This spring pressure is balanced by the spring cantilever action of opposing spring member 62 developed by its end 61 at its post slot 48. Crystal plate 65 is thus firmly gripped with spring pressure between the opposite raised corner portions 66 of electrodes 64. The electrodes are shown in this embodiment as separate members but obviously may be made integral with the spring members as in the embodiment of Figures 1 to 7. Shoulder elements 67 are provided to limit vertical displacement of the crystal plate 65 and electrodes 64 within the holder cavity. Lateral displacement of the electrodes and crystal plate is limited by the shallow recessed configuration of the spring members 62 shown in Figure 8. Since the width of the recessed portion must be maintained substantially constant so as to properly position the electrodes and crystal plate with respect to each other, the bend 63 on each spring member 62 is formed by striking out an intermediate portion of spring member 62 to form a bent tongue which can provide the necessary spring action without altering the width of the shallow recess.

The embodiment of Figure 10 is similar to that of Figures 8 and 9 except that the spring member 62' is provided with dual bent tongues 63 to provide the spring action on the electrode and crystal assembly. In this embodiment the cantilever action of the secured end of the spring member 62' is not relied upon to provide the balanced spring pressures. This structure is somewhat more rugged than the structure of Figures 8 and 9 and a spring of lighter gauge material may be used to provide the same spring pressure as would be developed by the spring member 62 of the embodiment of Figures 8 and 9.

The holder, as embodied in either Figures 8 and 9 or in Figure 10, is assembled by preparing sub-assemblies each consisting of segment body 70 with spring member 62 or 62' having its end portion inserted and secured in slot 48. An electrode 64 and a crystal plate 65 are placed in position on the spring member 62 or 62' of a first sub-assembly. An electrode 64 is placed in position on the spring member 62 or 62' of a second sub-assembly. A gasket ring is fitted into the gasket groove of the first sub-assembly and the two sub-assemblies are slid together to compress the gasket ring in the gasket grooves. A securing band 37 is then slipped over the two joining segments and forced into position in grooves 36 on the two segments.

Figure 13:
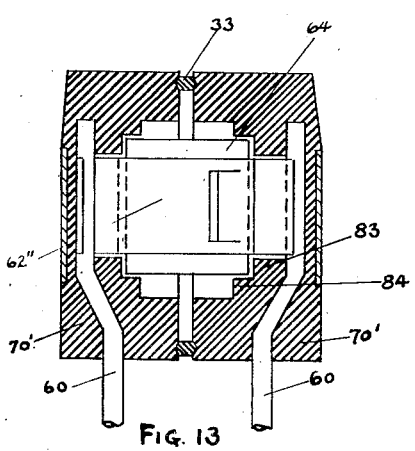
Figure 13 is a sectional view similar to Figure 9 showing a further modification of a holder according to this invention.

In the holders of Figures 8, 9 and 10 the shallow recessed configuration of the spring member 62 or 62' is relied upon to limit lateral movement of the electrodes and crystal plate. Because of this, during assembly of the holder the electrode mounted on the second sub-assembly must be slid across the crystal plate under a substantial amount of spring pressure. The frictional contact of the electrode with the crystal plate during this process may produce undesirable abrasion of either the crystal or the electrode. To avoid this the cavity of the segments may be provided with lateral positioning shoulders 83 as well as vertical positioning shoulders 84, as shown in the embodiment of Figure 13. In the embodiment of Figure 13 the shallow recessed configuration of the spring member may be omitted and the shoulders 83 relied upon to limit lateral displacement of the electrodes and crystal plate. To assemble the holder of Figure 13 sub-assemblies are prepared each consisting of holder segment 70' with spring members 62'' inserted and secured to the posts 60. Two electrodes 64 with a crystal plate between them are inserted in a first sub-assembly. A ring gasket 33 is fitted into the groove provided therefor on the first sub-assembly and a second sub-assembly is mated to the first sub-assembly by wedging the outer end of its spring member 62'' between the outer electrode and the opposing inner wall surface of the cavity in the segment 70' of the first sub-assembly. The two sub-assemblies are then slid together to compress the ring gasket in its grooves and a securing band is slipped over the segments and forced into the retaining grooves provided therefor, as described above for the previous embodiments of this invention.

It is pointed out that in the various embodiments of this invention the direction of clamping pressure on the crystal is at a considerable angle to the direction of the force exerted by the securing band on the gasket ring so that the reaction of crystal clamping pressure has only a very small component tending to relax the pressure on the gasket. In the embodiment of Figure 3 the direction of crystal clamping pressure is at about 60° to the direction of the force exerted by the gasket reacting to the securing band. According to the present invention this angle can be made 90° by suitable design of the crystal clamping structure to thereby reduce the component of crystal clamping pressure acting to relax gasket pressure to zero. This has been done in the embodiments of Figures 8, 9, 10 and 13.

While this invention has been described in terms of certain preferred embodiments it is understood that modifications may be made and that no limitations upon the invention are intended other than are imposed by the scope of the annexed claims.

Having thus described my invention what I claim is:

1. A holder for a piezo-electric crystal comprising a pair of cup-shaped members adapted to form a hollow casing when their peripheral surfaces are brought together into opposing relation, each cup-shaped member being provided with a clamping element secured thereto, at least one of the clamping elements being a leaf spring, the clamping element of one cup-shaped member being adapted to cooperate with the clamping element of the other cup-shaped member to resiliently clamp a crystal in the hollow casing when the peripheral surfaces are brought together.

2. A holder for a piezo-electric crystal comprising a pair of cup-shaped members adapted to form a hollow casing when their peripheral surfaces are brought together into opposing relation, securing means for maintaining the peripheral surfaces in opposing relation, each cup-shaped member being provided with a clamping element secured thereto, said clamping element having a clamping face oriented at a substantial angle to said peripheral surfaces, the clamping element of one cup-shaped member being adapted to cooperate with the clamping element of the other cup-shaped member to clamp a crystal in the hollow casing when the peripheral surfaces are brought together.

3. A holder for a piezo-electric crystal comprising a pair of cup-shaped members adapted to form a hollow casing when their peripheral surfaces are brought together into opposing relation, each cup-shaped member being provided with a clamping element, said clamping element having a clamping face oriented at a substantial angle to said peripheral surfaces, the clamping element of one cup-shaped member being adapted to cooperate with the clamping element of the other cup-shaped member to clamp a crystal in the hollow casing when the peripheral surfaces are brought together.

4. A holder for a piezo-electric crystal comprising a pair of cup-shaped members adapted to form a hollow casing when their peripheral surfaces are brought together into opposing relation, a deformable ring-shaped gasket member interposed between said peripheral surfaces, securing means for maintaining the peripheral surfaces secured in opposing relation with the gasket member pressed between them, each cup-shaped member being provided with a clamping element secured thereto, said clamping element having a clamping face oriented at a substantial angle to said peripheral surfaces, the clamping element of one cup-shaped member being adapted to cooperate with the clamping element of the other cup-shaped member to clamp a crystal in the hollow casing when the peripheral surfaces are brought into opposing relation.

5. A holder for a piezo-electric crystal comprising a pair of cup-shaped members adapted to form a hollow casing when their peripheral surfaces are brought together into opposing relation, a deformable ring-shaped gasket member interposed between said peripheral surfaces, said cup-shaped members being provided with cooperating means formed and arranged to support a crystal in operative position when the cup-shaped members are brought together, a rigid band adapted to be slipped over the cup-shaped members and to snugly embrace them to maintain them in assembled relation, a portion of the opposite side surfaces of the cup-shaped members being tapered to facilitate the mounting of the rigid band.

6. The invention as set forth in claim 5 and wherein socket means are provided on the opposite side surfaces of the cup-shaped members for receiving portions of the rigid band.

7. A holder for a piezo-electric crystal comprising a pair of cup-shaped members adapted to form a hollow casing when their peripheral surfaces are brought together, said cup-shaped members being provided with cooperating means formed and arranged to support a crystal in operative position at a substantial angle to said peripheral surfaces when the cup-shaped members are brought together.

8. A holder for a piezo-electric crystal comprising a pair of cup-shaped members adapted to form a hollow casing when their peripheral surfaces are brought together, a deformable gasket member interposed between the peripheral surfaces, said cup-shaped members being provided with means formed and arranged to support a crystal in operative position at a substantial angle to said peripheral surfaces in the hollow casing.

9. The invention as set forth in claim 8 and wherein opposed registering grooves are provided in said peripheral surfaces for receiving said gasket member.

10. A holder for a piezo-electric crystal comprising a pair of cup-shaped members adapted to form a hollow casing when their peripheral surfaces are brought together into opposing relation, a deformable ring-shaped gasket member interposed between said peripheral surfaces, said cup-shaped members being provided with cooperating means formed and arranged to support a crystal in operative position when the cup-shaped members are brought together, and securing means for maintaining the cup-shaped members clamped together with the gasket member positioned between their peripheral surfaces, said securing means being a band adapted to be snugly fitted around the cup-shaped members.

11. A holder for a piezo-electric crystal comprising a pair of cup-shaped members adapted to form a hollow casing when their peripheral surfaces are brought together into opposing relation, a deformable ring-shaped gasket member interposed between said peripheral surfaces, said cup-shaped members being provided with cooperating means formed and arranged to support a crystal in operative position when the cup-shaped members are brought together, and securing means for maintaining the cup-shaped members clamped together with the gasket member positioned between their peripheral surfaces, said securing means being a rigid band adapted to be slipped over the upper portions of the cup-shaped members and to snugly fit around said cup-shaped members.

12. A holder for a piezo-electric crystal comprising a pair of cup-shaped members adapted to form a hollow casing when their peripheral surfaces are brought together into opposing relation, a deformable ring-shaped gasket member interposed between said peripheral surfaces, said cup-shaped members being provided with cooperating means formed and arranged to support a crystal in operative position when the cup-shaped members are brought together, and securing means for maintaining the cup-shaped members clamped together with the gasket member positioned between their peripheral surfaces, said cup-shaped members being provided with grooves on their external surfaces and said securing means being a rigid band adapted to be snugly fitted into the grooves and to embrace the cup-shaped members.

HERMAN L. GORDON.